US009047401B2

(12) United States Patent
Choi et al.

(10) Patent No.: US 9,047,401 B2
(45) Date of Patent: Jun. 2, 2015

(54) EXCEPTION HANDLING TEST APPARATUS AND METHOD

(75) Inventors: Byoung Ju Choi, Seoul (KR); Joo Young Seo, Seoul (KR); Sueng Wan Yang, Gunpo (KR); Young Su Kim, Yongin Gyeonggi-Do (KR); Jung Suk Oh, Gwangmyeong (KR); Hae Young Kwon, Yongin (KR); Seung Yeun Jang, Goyang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 13/704,209

(22) PCT Filed: May 9, 2011

(86) PCT No.: PCT/KR2011/003436
§ 371 (c)(1),
(2), (4) Date: Dec. 13, 2012

(87) PCT Pub. No.: WO2012/153879
PCT Pub. Date: Nov. 15, 2012

(65) Prior Publication Data
US 2013/0086426 A1    Apr. 4, 2013

(51) Int. Cl.
*G06F 11/00* (2006.01)
*G06F 11/36* (2006.01)
*G06F 11/22* (2006.01)
(Continued)

(52) U.S. Cl.
CPC ........ *G06F 11/3612* (2013.01); *G06F 11/2221* (2013.01); *G06F 13/102* (2013.01); *G06F 9/45558* (2013.01); *G06F 11/079* (2013.01);
(Continued)

(58) Field of Classification Search
CPC . G06F 11/079; G06F 11/2221; G06F 13/102; G06F 9/45558
See application file for complete search history.

(56) References Cited

U.S. PATENT DOCUMENTS 5,613,123 A  *  3/1997  Tsang et al. ...................... 713/1
5,983,002 A  * 11/1999  Adams ............................ 714/42
(Continued)

FOREIGN PATENT DOCUMENTS

CN       101925883 A    12/2010
JP       H10133914 A     5/1998
(Continued)

OTHER PUBLICATIONS

International Search Report mailed Dec. 12, 2011 in PCT/KR2011/003436.
(Continued)

*Primary Examiner* — Charles Ehne
(74) *Attorney, Agent, or Firm* — Mintz Levin Cohn Ferris Glovsky and Popeo, P.C.; Peter F. Corless

(57) ABSTRACT

The present invention relates to an exception handling test apparatus and method. The exception handling test apparatus includes a generation module configured to generate a modified device driver based on a defect model and information obtained from the device manager, a hooking module configured to hook the device driver using the modified device driver, a scanning module configured to collect test information returned from the hooked modified device driver to the application while the application operates, and an analysis module configured to analyze the collected test information.

8 Claims, 3 Drawing Sheets

(51) Int. Cl.
*G06F 13/10* (2006.01)
*G06F 9/455* (2006.01)
*G06F 11/07* (2006.01)

(52) U.S. Cl.
CPC ........ *G06F 11/3664* (2013.01); *G06F 11/3692* (2013.01)

(56) References Cited

U.S. PATENT DOCUMENTS

| | | | |
|---|---|---|---|
| 7,580,826 B2 * | 8/2009 | Vega et al. | 703/24 |
| 2002/0184576 A1 * | 12/2002 | Arndt et al. | 714/48 |
| 2007/0074175 A1 | 3/2007 | Bengtsson et al. | |
| 2010/0312541 A1 | 12/2010 | Nishimura | |

FOREIGN PATENT DOCUMENTS

| | | |
|---|---|---|
| JP | 2009-104490 A | 5/2009 |
| JP | 2010-224795 A | 10/2010 |
| KR | 10-2004-0087767 | 10/2004 |
| KR | 10-2007-0087400 | 8/2007 |
| KR | 10-2008-0048035 | 5/2008 |
| KR | 10-2009-0083623 | 8/2009 |

OTHER PUBLICATIONS

Su, Xueli et al., "The plan of operating and monitoring documents based on Detours", Jrl. of Computer Application, vol. 30, Issue 12, pp. 3423-3426.

* cited by examiner

EXCEPTION HANDLING TEST APPARATUS AND METHOD

TECHNICAL FIELD

The present invention relates to an exception handling test apparatus and method, and more particularly, to an exception handling test apparatus and method which generate a defect using a modified device driver and checking whether or not exception handling has been performed on a system for the defect.

BACKGROUND ART

In an embedded system including various pieces of software and hardware, interaction is important in a system operating environment. Accordingly, not virtual data for a test including only software, but an operation using real data obtained in a live environment in which a system operates really is important. If it is sought to test a system, there is a need for a scheme capable of effectively detecting a potential defect or an operational defect occurring when the system operates really by performing a test for the system using real data for operation.

Furthermore, in order to independently test pieces of software that form a system, a lot of test resources and costs are necessary because additional equipment for replacing a counterpart component must be used. Accordingly, there is a need for a test apparatus, which can test all processes included in a system in real time and minimize memory space overhead or performance overhead due to the execution of a corresponding code.

DISCLOSURE

Technical Problem

An embodiment of the present invention is directed to providing an exception handling test apparatus and method, which can test an actual operating system and minimize test resource overhead in such a manner that a device driver modified using hooking technology is inserted into the system, a defect occurring due to the modified device driver is checked, and whether exception handling has been performed or not according to the checked defect.

Technical Solution

In an aspect, the present invention relates to an exception handling test apparatus. The exception handling test apparatus includes a generation module configured to generate a modified device driver based on a defect model and information obtained from the device manager, a hooking module configured to hook the device driver using the modified device driver, a scanning module configured to collect test information returned from the hooked modified device driver to the application while the application operates, and an analysis module configured to analyze the collected test information.

In another aspect, the present invention relates to an exception handling test method. The exception handling test method includes generating a modified device driver based on a defect model and information obtained from the device manager, hooking the device driver using the modified device driver, collecting test information returned from the hooked modified device driver to the application while the application operates, and analyzing the collected test information.

Advantageous Effects

In accordance with the present invention, an exception handling test using a device manager can be performed while a system operates actually because a target is an actual operating code, not a source code.

Furthermore, system overhead can be minimized because a hooking method using information about the process context of a specific memory space is used without inserting each code into each process.

Furthermore, although shared resources between processes are limited, information about a test can be collected in real time and a result of the test can be checked based on the information.

MODE FOR INVENTION

The present invention relates to a test in an live environment in which a system operates really and to an apparatus and method which can test a system in a dynamic situation from the start of the system to the end of the system. The present invention can perform a test for all processes which are operating within a system using hooking, that is, a kind of code insertion technology. More particularly, the present invention can test the type of detect that may occur from a device operating within a system and exception handling for the defect.

Figure 1:
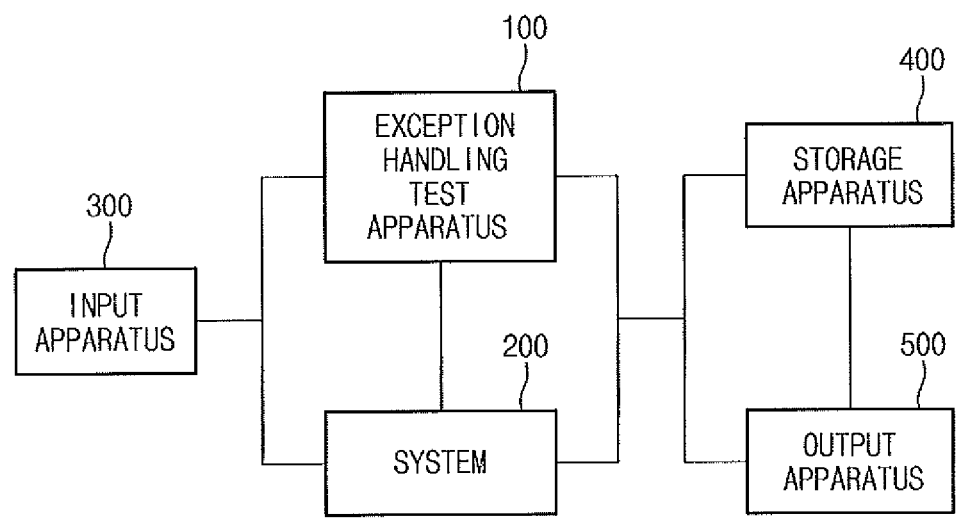
FIG. 1 is a diagram showing the entire system in which an exception handling test apparatus according to an embodiment of the present invention is used.

FIG. 1 is a diagram showing the entire system in which an exception handling test apparatus according to an embodiment of the present invention is used.

As shown in FIG. 1, the entire system includes an exception handling test apparatus 100, a system 200, an input apparatus 300, a storage apparatus 400, and an output apparatus 500.

The exception handling test apparatus 100 tests the type of detect, occurring in a communication process between an application and a device included in the system 200, and exception handling for the defect. The exception handling test apparatus 100 can test a system by generating a modified device driver using a device manager that manages devices included in the system and generating a defect using the modified device driver. The exception handling test apparatus 100 may be provided independently from the system 200 as shown in FIG. 1 or may be included in the system 200.

The system 200 may include all embedded systems and computer systems in which multiple processes perform communication and may become, for example, an infotainment system, a multimedia system, or a wired/wireless network system. For example, if the system 200 is a vehicle infotainment system, the system 200 may include Terrestrial Digital Multimedia Broadcasting (TDMB), Transport Protocol Expert Group (TPEG), IPOD, USB, Bluetooth, Voice Recognition (VR), a Parking Guidance System (PGS), a Radio Data System (RDS), Vehicle CDC (VCDC), a Driver Information System (DIS), Rear Seat Entertainment (RSE), a Hybrid Electric Vehicle (HEV) display, and an Air Handling Unit (AUH) display on the basis of an Audio Video Navigation (AVN) function.

The system 200 further includes devices, device drivers for the transmission/reception of data between the devices and applications, a device manager configured to manage the devices, and applications connected to the device manager and configured to execute specific programs using the devices. Accordingly, the exception handling test apparatus 100 can perform an exception handling test by checking a device driver that is now being activated using the device manager, generating a modified device driver corresponding to the device driver, and hooking the device driver using the modified device driver. Here, the device is a hardware device, such as a Universal Serial Bus (USB) and a multimedia player, and may be a device physically separated from a device in which an application operates. The system 200 of the present invention is a concept that includes physically separated devices and devices in which applications operate.

The input apparatus 300 is a user input apparatus for driving the exception handling test apparatus 100 and the system 200. The input apparatus 300 may be implemented using a keyboard or a touch screen. An application included in the system 200 is executed in response to a signal inputted through the input apparatus 300, and the system 200 whose device driver modified by the exception handling test apparatus 100 has been hooked operates.

The storage apparatus 400 stores pieces of information collected by the exception handling test apparatus 100. The exception handling test apparatus 100, together with the storage apparatus 400, may be implemented into one device and configured to collect test information and analyze and store the collected test information.

The output apparatus 500 outputs test information collected by the exception handling test apparatus 100 or a result of an analyzed test in the form of an image or voice.

Figure 2:
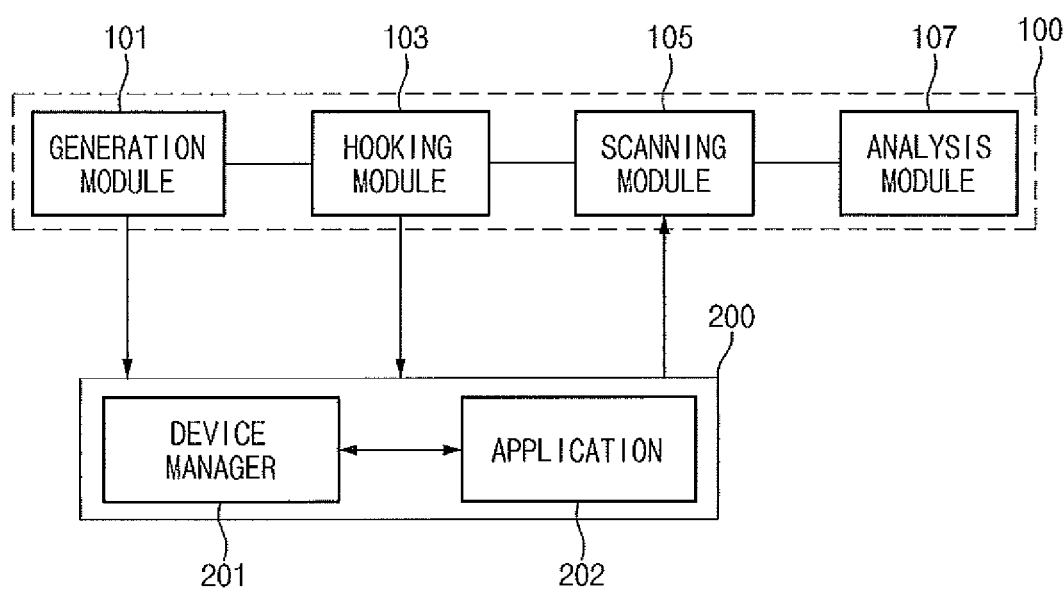
FIG. 2 shows the construction of the exception handling test apparatus according to an embodiment of the present invention.

FIG. 2 shows the construction of the exception handling test apparatus according to an embodiment of the present invention.

As shown in FIG. 2, the exception handling test apparatus 100 includes a generation module 101, a hooking module 103, a scanning module 105, and an analysis module 107. The system 200 connected to the exception handling test apparatus 100 includes devices (not shown), device drivers (not shown) for the transmission/reception of data between the devices and applications, a device manager 201 configured to manage the devices, and an application 202 connected to the device manager 201 and configured to implement specific functions through the devices. The exception handling test apparatus 100 may perform an exception handling test for two or more devices (not shown) and the two or more applications 202.

The device manager 201 includes run-time execution information about all the device drivers included in the system 200. The run-time execution information means execution information between all the device and processes while the system 200 operates. That is, the device manager 201 manages pieces of information about the name of a device activated within the system 200, the device driver of the activated device, an operation used in each device driver, the start address of the operation, a memory address on which a device driver has been loaded, and a memory space. Accordingly, a data structure or apparatus including the above-described information within all systems corresponds to the device manager 201 in the present invention. The generation module 101 collects information about a device driver that is now operating in the system 200 using the device manager 201 and generates a modified device driver based on a defect model and the collected information about the device driver. The defect model is described in detail later with reference to FIG. 4.

The modified device driver generates a defect in the operation of the system by modifying data transmitted to and received from a device. That is, the modified device driver analyzes protocol data, used in each operation, according to a device, modifies data passing through the device according to a modification rule, uses the modified data in a communication process between an application and the device, and generates a defect in the operation of the system. Examples the modification rule may include a modification rule that data transmitted to and received from a device is lost, a modification rule that a value corresponding to the boundary of a valid range is added to data transmitted to and received from a device, and a modification rule that data values are mixed due to a data transfer obstacle.

The input apparatus 300 may select a test target and information about a device driver, that is, the test target may be collected, or information about a device driver that is now operating may be collected and the input apparatus 300 may select the device driver, that is, a test target.

The hooking module 103 hooks an original device driver using a modified device driver generated by the generation module 101. That is, the hooking module 103 may hook an original device driver based on information collected by the generation module 101. For example, the hooking module 103 may hook an original device driver by changing the start address (from among pieces of information managed by the device manager 201) of the operation of a device driver, that is, a test target, into the start address of the operation of a modified device driver. Accordingly, while a system operates, the modified device driver is fetched instead of the original device driver.

The scanning module 105 is executed by a modified device driver while a device and an application operate and is configured to collect test information that is returned to the application. For example, the scanning module 105 may collect the operation return value of a device driver, an exception code value generated from the device manager 201, the return value of an application, or a system-abnormal code. While the application 202 operates, the scanning module 105 may further collect system dynamic state information necessary to determine a defect, such as a function parameter, a return value, and a performance measurement value.

That is, the scanning module 105 collects the type of detect in the operation of the system which occurs because data modified by a modified device driver is used and checks a result of the exception handling of the system for the defect.

The analysis module 107 analyzes an exception collected by the scanning module 105 and a result of exception handling. That is, the analysis module 107 determines whether an application performs exception handling properly or not based on collected information. For example, if a result of exception handling is a pass, the analysis module 107 outputs an exception code suitable for an exception generated from the system and determines that an application has performed proper handling. If a result of the exception handling is a failure, the analysis module 107 determines that an application has not properly handled an exception generated from the system.

Some cases that a result of exception handling is a failure are classified into the entire system down (i.e., catastrophic), some process down (i.e., restart), the abnormal termination of some processes (i.e., abort), an abnormal operation of some processes (i.e., abnormal), an abnormal return and no error code (i.e., silent), and a normal return and incorrect error code return (i.e., hindering).

Figure 3:
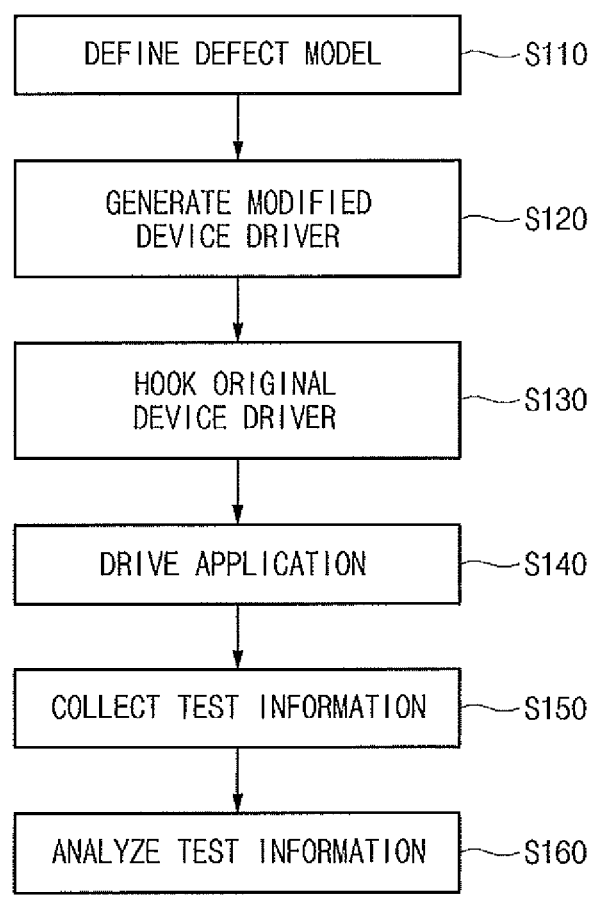
FIG. 3 is a flowchart illustrating an exception handling test method according to an embodiment of the present invention.

FIG. 3 is a flowchart illustrating an exception handling test method according to an embodiment of the present invention.

FIG. 3 shows an exception handling test method for testing a defect occurring in a communication process between an application and a device and performing an exception handling test for the defect. First, a defect model is defined at step S110. The defect model means information for discovering and recovering the defect of a device and a device driver that have to be tested according to the type of detect. The defect model may be changed depending on a device and a device driver, that is, test targets. A modified device driver capable of collecting test information while the system 200 operates normally may be generated according to the defined defect model.

Here, the type of detect occurring in a communication process between an application and a device is a code to generate a defect that is related to connection between the application and the device, device open, disconnection, device close, null data, illegal data, and timing which are related to data I/O, or device power. The type of detect is described in more detail below.

A modified device driver is generated based on the defect model, defined at step S110, and information about a device driver now operating in the system 200 at step S120.

Next, an original device driver is hooked into the modified device driver at step S130. In other words, the modified device driver is fetched instead of the original device driver at a point of time at which the original device driver is fetched.

Next, the application 202 connected to the device manager 201 is driven at step S140. When the application 202 operates, the device manager 201 and a device (not shown) also operate.

While the application 202 operates, the results of execution by the modified device driver, that is, a defect occurring in the operation of the system 200 and a result of exception handling of the system for the defect are collected at step S150. The test information collected at step S150 includes current call-stack information, device driver information, and process information. The call-stack information may be used to check that a problem has occurred in a flow in what sequence. The device driver information includes a return value and an error ID, and the process information includes the ID and name of a process.

The test information collected at step S150 is analyzed at step S160. Whether the application 202 performs exception handling properly may be checked based on a result of the analysis at step S160.

The defect model according to the present invention includes defects related to connection between an application and a device, device open, disconnection, device close, null data, illegal data, and timing which are related to data I/O, or device power.

The defect related to 'CONNECTION' may be classified into a device connection reset failure and a device open failure.

The defect related to 'DISCONNECTION' may be classified into a device termination failure and a device disconnection failure.

The defect related to 'DEVICE CLOSE' may be defined as a device close failure.

The defect related to 'NULL DATA' may be classified into a data read failure from a device, a data write failure into a device, a data search failure for a device, and an I/O control (IOCTL) data transfer failure from a device.

The defect related to 'ILLEGAL DATA' may be classified into erroneous data read from a device, erroneous data read in a device, erroneous data search for a device, IOCTL transfer of an erroneous value to a device, and IOCTL transfer of an erroneous value from a device.

The defect related to 'DEVICE POWER' may be classified into a device power-up failure and a device power-down failure.

The present invention may be implemented in a recording medium in the form of a code readable by a processor. The recording medium readable by a processor includes all kinds of recording devices in which data readable by a processor is stored. The recording medium may include, for example, ROM, RAM, CD-ROM, magnetic tapes, floppy disks, and optical data storages. Furthermore, the recording medium readable by a processor may be distributed over computer systems connected over a network, and the code readable by a processor may be stored and executed in a distributed manner.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

In accordance with the present invention, an exception handling test using a device manager can be performed while a system operates really.

The invention claimed is:

1. An exception handling test apparatus for a system including a device driver, a device manager, and an application, the apparatus comprising:
   a generation module configured to generate a modified device driver based on a defect model and information obtained from the device manager;
   a hooking module configured to hook the device driver using the modified device driver;
   a scanning module configured to collect test information returned from the hooked modified device driver to the application while the application operates; and
   an analysis module configured to analyze the test information collected by the scanning module,
   wherein if the test information indicates that a defect has occurred, the application performs exception handling according to the generated defect, and
   wherein if the exception handling is not normally performed, the analysis module analyzes the test information as at least one of entire system down, some process down, an abnormal termination of some processes, an abnormal operation of some processes, an abnormal return and no error code, and a normal return and incorrect error code return.

2. The exception handling test apparatus of claim 1, wherein the defect model is at least one of connection between the application and a device, device open, disconnection, device close, null data, illegal data, and timing which are related to data I/O, and device power.

3. The exception handling test apparatus of claim 1, wherein the test information is at least one of an operation return value of the modified device driver, an exception code value generated from the device manager, a return value of the application, and a system-abnormal code.

4. The exception handling test apparatus of claim 1, wherein the defect model is changed depending on a device and a device driver which are test targets.

5. An exception handling test method for a system, comprising a device driver, a device manager, and an application, the method comprising:
- generating a modified device driver based on a defect model and information obtained from the device manager;
- hooking the device driver using the modified device driver;
- collecting test information returned from the hooked modified device driver to the application while the application operates; and
- analyzing the collected test information,
- wherein if the test information indicates that a defect has occurred, the application performs exception handling according to the generated defect, and
- wherein if the exception handling is not normally performed, the analysis module analyzes the test information as at least one of entire system down, some process down, an abnormal termination of some processes, an abnormal operation of some processes, an abnormal return and no error code, and a normal return and incorrect error code return.

6. The exception handling test method of claim 5, wherein the defect model is at least one of connection between the application and a device, device open, disconnection, device close, null data, illegal data, and timing which are related to data I/O, and device power.

7. The exception handling test method of claim 5, wherein the test information is at least one of an operation return value of the modified device driver, an exception code value generated from the device manager, a return value of the application, and a system-abnormal code.

8. The exception handling test method of claim 5, wherein the defect model is changed depending on a device and a device driver which are test targets.

* * * * *

UNITED STATES PATENT AND TRADEMARK OFFICE
CERTIFICATE OF CORRECTION

PATENT NO. : 9,047,401 B2
APPLICATION NO. : 13/704209
DATED : June 2, 2015
INVENTOR(S) : Byoung Ju Choi et al.

It is certified that error appears in the above-identified patent and that said Letters Patent is hereby corrected as shown below:

On the title page of the patent, at Column 1, in the section designated "Assignees" (item (73)), please add --EWHA University-Industry Collaboration Foundation, Seoul (KR)--

Signed and Sealed this
Twenty-sixth Day of April, 2016

Michelle K. Lee
*Director of the United States Patent and Trademark Office*